Oct. 17, 1950
C. K. WILKINSON ET AL
2,525,845
POWER VOLTMETER
Filed Oct. 7, 1944
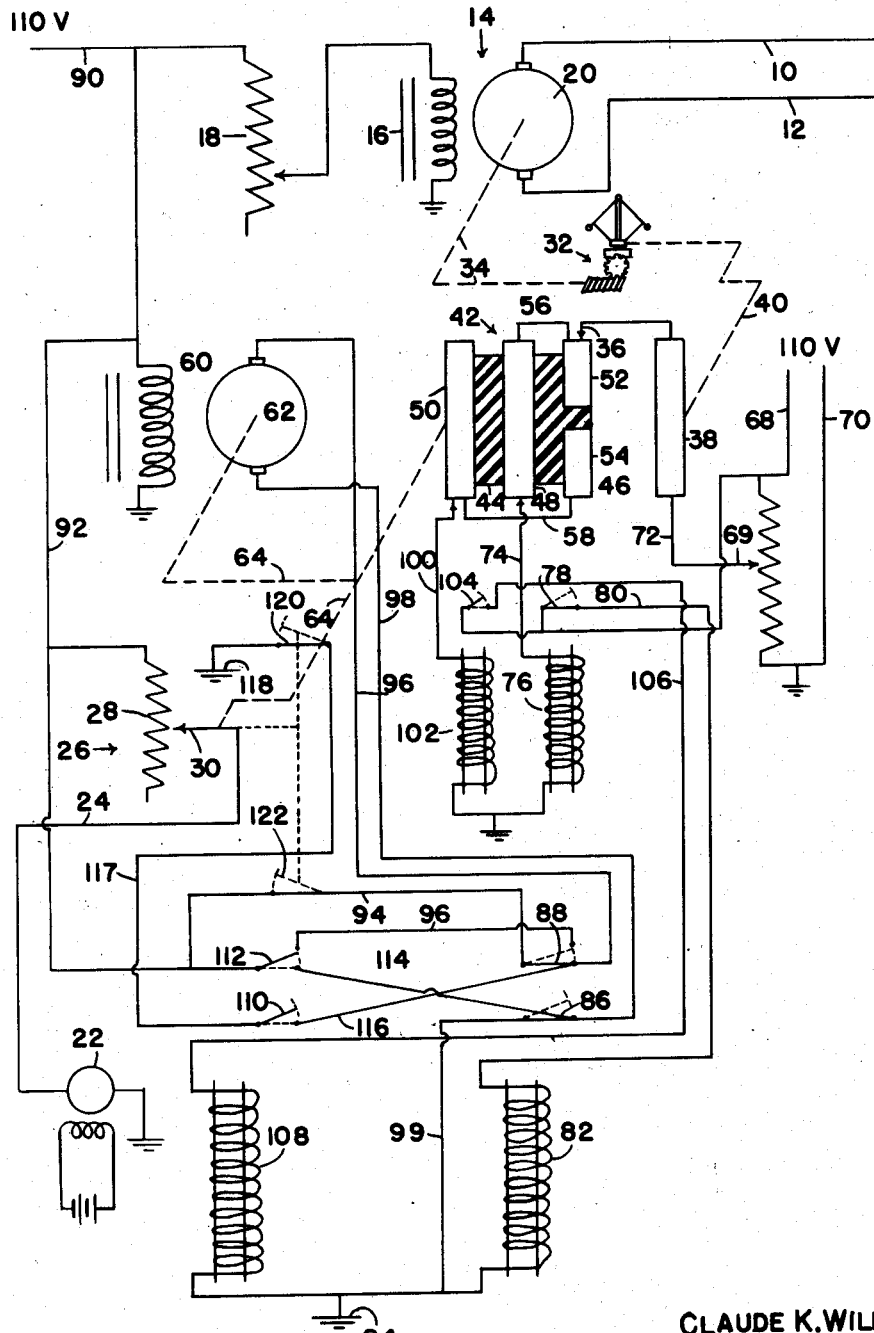
Inventors
CLAUDE K. WILKINSON
REEVE C. MOREHOUSE
By W. Glenn Jones
Attorney Patented Oct. 17, 1950

2,525,845

UNITED STATES PATENT OFFICE 2,525,845

POWER VOLTMETER

Claude K. Wilkinson and Reeve C. Morehouse,
United States Navy

Application October 7, 1944, Serial No. 557,734

9 Claims. (Cl. 318—31)

(Granted under the act of March 3, 1883, as
amended April 30, 1928; 370 O. G. 757)

This invention relates to indicators and more especially to instruments to be used in ground trainers for simulating air speed drift, etc., in response to the manipulation of the controls.

In a co-pending application, Serial No. 557,733, filed in our names, October 7, 1944, now Patent No. 2,510,161, there is described and illustrated a circuit including instruments calibrated in units of air speed for use in ground trainers to simulate indicated air speed. These instruments are connected across a generator which constitutes part of a motor-generator combination so designed, that when the load on the motor is varied in accordance with the attitude of the trainer, the voltage output of the generator will vary in a corresponding degree to cause the instruments to indicate an air speed indicative of the attitude of the trainer.

While the aforesaid application is concerned only with air speed instruments, there are other instruments employed in ground trainers which require adjustment proportional to the indicated air speed, and since the voltage output of the generator circuit referred to above is proportional to the indicated air speed, it forms a convenient means to effect adjustment of these instruments in proportion to the indicated air speed.

It is an object of the present invention to provide means which will be responsive to the voltage in the circuit referred to above and which will develop sufficient power to effect adjustment of an instrument in proportion to the voltage and hence to the indicated air speed.

As shown herein, a power voltmeter motor is connected across a pair of input lines, such as are connected to the output side of the generator circuit of the application referred to above, and responds in speeds proportional to the voltage output from the generator and hence in proportion to the indicated air speed, since as described in the prior application, the generator output is proportional to the indicated air speed.

In one aspect, invention resides in the combination of an adjustable instrument through which current may be caused to flow with means connected to the aforesaid input voltage and directly proportional thereto to effect adjustment of the instrument proportionally to the input voltage and hence to vary the current flow through the instrument in proportion to the air speed. More specifically, novelty resides in a variable resistance through which current is transmitted to any instrument, the operation of which is designed to be proportional to the indicated air speed, and means connecting the resistance to the aforesaid power voltmeter motor, said means being actuated by the power voltmeter motor to effect adjustment of the variable resistance in accordance with the voltage input impressed on the power voltmeter motor, and hence to cause the current transmitted to and through the instrument to vary in proportion to the impressed voltage.

The details of the means for accomplishing the results related above will now be described with reference to the accompanying drawing, in which:

The single figure shows a diagrammatical layout of our invention.

Referring to the figure, there is shown a pair of input lines 10 and 12 which deliver power to a power voltmeter motor 14, the voltage input to the lines 10 and 12 being proportional for example to indicated air speed such as will be derived from connecting the lines 10 and 12 across the lines 26 and 34 of the circuit shown in our co-pending application. The field 16 of the voltmeter motor 14 may be kept constant for a given set of conditions, however, in certain circumstances as will appear hereinafter, it is desirable to vary the field current, hence, there is provided a rheostat 18 having a variable resistance therein through which current is delivered from a 110-v. direct current line to the voltmeter motor field 16.

As illustrated herein, by way of example, there is provided a drift indicator motor 22 to which there is connected by way of a conductor 24, a rheostat 26 having a resistance 28 and a movable contact 30. During flight, drift is proportional to the air speed of the plane and hence in simulating drift in the ground trainer, the drift instrument must indicate changes in rate of drift which are proportional to the indicated air speed. In the ground trainer to which this invention is applied the drift indicator is mounted on tracks and propelled by motor 22 in the relative direction of the assumed aircraft heading over a simulated ocean or ground represented on a strip chart moving in a relative direction and at a speed with respect to the drift indicator's motion corresponding to the wind direction and speed. It is a purpose of this invention to design means for varying the position of the contact 30, and hence the current through the drift indicator motor in a manner which is proportional to the voltage impressed on the voltmeter motor 14 so as to cause the drift indicator to indicate drift variation which is proportional to the voltage input, and hence to the indicated air speed. This is accomplished herein by employing the torque developed by the power voltmeter motor 14 to drive a governor 32, the latter being of a standard type and being coupled to the voltmeter motor by means 34. The governor 32 takes very little power for rotation and since it is coupled directly to armature 20 of the power voltmeter motor its speed will be directly proportional to the input voltage. The governor 32 in turn is arranged to cause rotation of a contact 36 carried by a member 38 which is coupled for rotation to the governor by a shaft 40 and will rotate in one direction or the other depending upon an increase or decrease in the speed of the governor. The contact 36 is arranged to make contact with a rotatable switch 42, the latter comprising a cylindrical member consisting of insulating material 44 having fastened thereto, three spaced conducting rings 46, 48 and 50. The ring 46 consists of two semi-circular bands 52 and 54, the opposite ends of which are separated by the insulation. The half ring 52 is electrically connected by a conductor 56 to the ring 48 and the half ring 54 is electrically connected by a conductor 58 to the ring 50. The rotatable switch 42 is rotated relative to the contact 36, as will be described hereinafter. In order to move the contact 30 along the resistance 28 there is provided an electric motor 60, the armature 62 of which is mechanically coupled by means 64 to the contact 30 in a manner to produce rotational or linear movement depending upon the construction of the rheostat. As illustrated herein, the armature 62 is also coupled to the rotatable switch to cause rotation thereof and preferably this is accomplished by mounting the rotatable switch directly on the armature shaft. The motor 60 is supplied with current from the 110-v. direct current line 90, and its size may be varied to take care of the work that it has to perform. As illustrated, direct current from the supply line 90 may reach the motor 60 through one or the other of two circuits to drive the motor in one direction or the other as follows: Upon rotation of the contact 36 into engagement with the half ring 52 current from the conductor 68 is caused to pass through a contact 69, the member 38, the contact 36, the half ring 52, the conductor 56 and the ring 48 to a conductor 74 and hence through an electromagnet relay 76. This energizes the electromagnet relay 76 and closes the switch 78 so that the current flows from the line 68 through the switch 78 to a line 80. From thence, the current passes through a relay 82 to the ground 84, closing switches 86 and 88. Current from the 110-v. direct current line 90 then passes by way of a conductor 92, a conductor 94, the switch 88 and a conductor 96 to one side of the motor 60. The opposite side of the motor is grounded by way of a conductor 98, switch 86, and conductor 99. If the contact 36 is in engagement with half ring 54, however, the current passes through the conductor 58, ring 50, and conductor 100 to energize the electromagnet relay 102 which closes the switch 104. Current will then pass from the line 68 through the switch 104, conductor 106 and relay 108 to the ground 84. This closes the switches 110 and 112. The current from the line 90 will now pass through conductor 92, the switch 112, conductor 114, and conductor 98 to the opposite side or previously ground side of the motor. The opposite side of the motor as now set up is grounded by way of the conductor 96, the conductor 116, switch 110, conductor 117 and ground 118.

It is obvious that with the above described circuit, the motor 60 may be run in one direction or the other depending upon whether the contact is made with the half ring 52 or the half ring 54. It will now also be evident that when the governor 32 rotates at a given speed, the contact 36 will be rotated along the half ring 52 a distance proportional to the voltage impressed on the power voltmeter motor. This will set the contact 30 at an angular position with respect to the rotatable switch 42. If for example, the contact 36 is in engagement with the half ring 52, the motor 60 will be caused to rotate in a direction to rotate the rotatable switch in the same direction as the contact 36 rotated. As rotation continues the non-conducting portion between the rings 52 and 54 will be moved under the contact 36 and the motor 60 will then stop. Since the rotation is proportional to the voltage input, the rotation of the motor ceases when the non-conducting surface is reached and the motor will have moved the contact 30 through a distance which is proportional to the voltage input. Now if the speed of the governor decreases due to a decrease in the voltage input, the member 38 will rotate in the opposite direction moving the contact 36 along the surface of the other ring 54, a distance proportional to the decrease in speed and hence cause rotation of the motor 60 in the opposite direction so that the rotatable switch will again be rotated until the non-conducting portion is brought to the contact 36. Hence the motor will stop with the contact 30 having moved a distance proportional to the reduction in speed in the opposite direction.

As a plane climbs, the density of the air becomes less and this results in an increase in indicated air speed. To simulate this condition in the ground trainer and to compensate for the error introduced by the variation in the density of the air, the voltage input which represents indicated air speed, should be connected to give a variation which is proportional to the true air speed. This is accomplished here by adjusting the rheostat 18 which in turn adjusts the current input through the field 16 of the voltmeter motor. The rheostat is automatically varied by an altimeter not shown herein.

A cut-out is provided for the circuit which consists of switches 120 and 122 which may be manually operated to interrupt the entire circuit when it is desirable to have the drift indicator show a zero air-speed-component reading.

While the invention has been described herein with reference to the adjustment of a drift indicator, it is evident and it is entirely within the scope of the present invention to apply the above described circuit to effect adjustment of any electrical instrument where it is desirable to have the instrument respond to voltage variations and where the torque developed by an ordinary power voltmeter motor is not sufficient to bring about the desired adjustment.

The invention described herein may be manufactured and used by or for the Government of the United States of America for governmental purposes without the payment of any royalties thereon or therefor.

What is claimed is:

1. In a ground trainer, a first circuit which is supplied with a low power variable voltage input proportional to the simulated air speed, a second circuit supplied with a variable voltage input proportional to the simulated altitude, a conductor, an adjustable impedance adapted to control the flow of current through said conductor, an electric motor for adjusting said adjustable impedance, a motor shaft on said motor, a reversible switch mounted on the motor shaft adapted to reverse the direction of flow of current through the motor, and means including a governor operable in response to the voltage inputs to rotate the switch in reverse directions in accordance with variations in the input voltages.

2. In airplane training apparatus of the character disclosed having two voltages applied thereto, one of said voltages representing altitude and the other of said voltages being of low power and representing wind speed uncorrected for altitude, and for providing a high power output corresponding to true wind speed corrected for altitude, in combination, a high power motor for providing said output, a variable resistance connected to said motor through which current is transmitted to said motor, a reversible motor operable to vary said resistance, means for energizing the reversible motor, a motor shaft on said reversible motor, a member on said motor shaft, said member having oppositely disposed conducting portions with non-conducting portions therebetween, a movable contact adapted to selectively engage the conducting portions and the non-conducting portions, circuit means including said energizing means and connecting said conducting portions and said contact to said reversible motor for controlling the operation of said reversible motor, and means including a governor and a voltmeter motor for moving said contact, said voltmeter motor having field and armature windings to which said two voltages are respectively applied, said contact being moved in response to changes in said two voltages a distance which is a function of both said voltages whereupon said reversible motor is caused to rotate said member in a direction to move said non-conducting portions relative to said contact until one of said non-conducting portions is again adjacent said contact.

3. A device for controlling the speed of a high power electric motor as a function of two given voltages, at least one of said given voltages being of lower power, comprising a variable resistor connected to the motor through which current is transmitted to the motor, a reversible motor operable to vary the resistance of said resistor, circuit means for energizing said reversible motor, a rotatable member operated by said reversible motor and having oppositely disposed conducting portions separated by non-conducting portions, a contact, said contact and conducting portions being connected in said circuit means, said contact being adapted to selectively engage the conducting portions to control the direction of rotation of said reversible motor and selectively engage the non-conducting portions to stop said reversible motor, a governor operatively connected to said contact, an additional motor the speed of which is controlled by said two given voltages, said governor being operated by said additional motor and adapted in response to a change in at least one of said two voltages to move said contact from a non-conducting portion along one of the conducting portions a distance controlled by said change whereupon said reversible motor is caused to rotate said member in a direction to move said last named conducting portion and said last named non-conducting portion relative to said contact until said non-conducting portion is again in engagement with said contact.

4. A device for controlling the speed of a high power electric motor as a function of two given voltages, at least one of said given voltages being of low power, comprising a variable resistor connected to said motor through which current is transmitted to said motor, a reversible motor operable to vary the resistance of said resistor, circuit means including a source of potential for energizing the reversible motor, a motor shaft on said reversible motor, a switch mounted on said motor shaft and connected in said circuit means for controlling the energization of said reversible motor, said switch including two conducting half rings separated by insulation, a contact adapted to selectively engage the half rings and the insulation therebetween, and means including a governor responsive to changes in said given voltages for moving the contact from the insulation along a half ring a distance which is controlled by said changes whereupon said reversible motor is energized and said switch is caused to rotate a distance to move said last named half ring with respect to the contact to bring the insulation back into engagement with said contact.

5. A device for controlling the speed of a high-power electric motor as a function of two given voltages, at least one of said given voltages being of low power, comprising a variable resistor connected to the motor and through which current is transmitted to said motor, a reversible motor operable to vary the resistance of said resistor, circuit means including a source of potential for energizing the reversible motor, a motor shaft on said reversible motor, a switch mounted on said motor shaft connected in said circuit means and operable to effect energization of the reversible motor, said switch having oppositely disposed conducting portions separated by non-conducting portions, a contact adapted to selectively engage the conducting portions and the non-conducting portions, means including a governor for moving the contact from a non-conducting portion along one of the conducting portions a distance proportional to a change in either of said given voltages whereupon said reversible motor is caused to rotate said switch in a direction to cause said conducting portion to rotate with respect to said contact to bring the non-conducting portion back into engagement with said contact.

6. In a ground trainer, circuit means to which is applied two voltage inputs corresponding respectively to air speed and altitude, a conductor, an adjustable impedance adapted to control the flow of current through said conductor, a reversible electric motor for adjusting said adjustable impedance, a motor shaft for said motor, means including a reversible switch mounted on the motor shaft and adapted to reverse the direction of flow of current through the motor, and a governor operable in response to changes in said voltage inputs to rotate the switch in reverse directions selectively in accordance with increases and decreases in said last named voltage input.

7. In a device for controlling the speed of a high power electric motor as a function of two given voltages, at least one of said given voltages being of low power, in combination, a variable resistance connected to the motor through which current is transmitted to said motor, a reversible motor operatively connected to said resistance, electric circuit means for energizing said reversible motor, said circuit means including a pair of relays operable to reverse the direction of current flow through the reversible motor, a member operatively connected to said reversible motor and rotatable therewith, said member having two conducting portions separated by non-conducting portions, means connecting one of said conducting portions with one of the relays of said pair and the other of said conducting portions with the other of the relays, a contact adapted to selectively engage said conducting portions and the non-conducting portions, said contact being movable from a non-conducting portion along one of the conducting portions, means for moving said contact a distance proportional to change in at least one of said given voltages, said last named means including an additional motor having two windings and having said given voltages applied to said windings respectively, and a governor operatively connected to said additional motor and to said contact.

8. In apparatus of the character disclosed for obtaining a high power rotary output of which the speed is a function of two independently varying voltages, one of said voltages being obtained from a low power source, in combination; a low power motor having field and armature windings, means including a variable resistor element connecting said field winding to be energized by one of said voltages; means for applying the other of said voltages to said armature winding; governor means operatively connected to said motor; a reversible motor having a shaft; switch means carried by said shaft, said switch means including an insulating support member, a pair of conductor rings mounted in spaced position on said support member, and a pair of mutually disposed conductor half rings mounted upon said support member and insulated from each other; a movable contact member for said half rings operatively connected to said governor means and adapted to be rotated in two directions selectively in accordance with increases and decreases of the speed of said low power motor, said contact member engaging said pair of half rings selectively in accordance with changes in the speed of said low power motor and changes in the setting of said insulating support member; circuit means including relays, a source of potential, and said rings and half rings and operatively connected to said reversible motor for rotating said reversible motor selectively in directions which restore said contact member to a neutral position between said half rings; rheostat means operatively connected to said reversible motor and adapted to have the arm thereof positioned in accordance with the setting of said shaft; a third high power motor adapted to supply said high power rotary output; and additional circuit means including said rheostat and operatively connecting said third motor to said source of potential whereby the speed of said third motor is controlled in accordance with the setting of the arm of said rheostat.

9. In apparatus of the character disclosed, in combination, a first motor, a rheostat having an adjustable arm, a source of potential, circuit means including said rheostat and connecting said first motor to said source of potential whereby the speed of said first motor is controlled by the setting of said arm, a reversible motor having a shaft, said arm being connected to said shaft, single pole double throw switching means mounted upon said shaft, the contacts of said switching means being movable in accordance with the setting of said shaft, the arm of said switching means being movable, said switching means being adapted to be operated to close the circuit through the contacts thereof selectively in accordance with the setting of said shaft, means including a pair of relays adapted when energized to selectively connect said reversible motor to said source of potential whereby said reversible motor selectively rotates said shaft in opposite directions, circuit means connecting said pair of relays to said single-pole double-throw switching means whereby said relays are selectively energized in accordance with the setting of said switching means, a governor, means operatively connecting said switch arm to said governor whereby said switch arm is moved in two directions selectively in accordance with increases and decreases in speed of said governor, additional motor means having field and armature windings and having the shaft thereof operatively connected to said governor, said field winding being energized by a first potential, said armature winding being energized by a second potential, said first motor having the speed thereof controlled by both said first and second potentials.

CLAUDE K. WILKINSON.
REEVE C. MOREHOUSE.

REFERENCES CITED

The following references are of record in the file of this patent:

UNITED STATES PATENTS

| Number | Name | Date |
|---|---|---|
| 803,209 | Bates | Oct. 31, 1905 |
| 1,228,392 | Beighlee | June 5, 1917 |
| 1,408,211 | Laycock | Feb. 28, 1922 |
| 1,474,309 | Bradshaw | Dec. 11, 1923 |
| 1,558,824 | Beall | Oct. 27, 1925 |
| 1,587,122 | Harlow | June 1, 1926 |
| 1,618,790 | Watson | Feb. 22, 1927 |
| 1,651,852 | Trenor | Dec. 6, 1927 |
| 1,690,498 | Hume | Nov. 6, 1928 |
| 1,774,673 | Schleicher | Sept. 2, 1930 |
| 1,835,533 | Sipher | Dec. 8, 1931 |
| 1,916,737 | Midworth | July 4, 1933 |
| 1,919,992 | Stewart | July 25, 1933 |
| 1,954,142 | Moffet | Apr. 10, 1934 |
| 2,067,413 | Plaisted | Jan. 12, 1937 |
| 2,085,010 | Dillon | June 29, 1937 |
| 2,331,354 | Stout | Oct. 12, 1943 |